(12) United States Patent
Yamakawa et al.

(10) Patent No.: US 11,969,777 B2
(45) Date of Patent: Apr. 30, 2024

(54) STRUCTURE AND METHOD FOR PRODUCING SAME

(71) Applicant: KOBE STEEL, LTD., Hyogo (JP)

(72) Inventors: Taiki Yamakawa, Kobe (JP); Toru Hashimura, Kobe (JP); Yasuhiro Maeda, Kobe (JP)

(73) Assignee: KABUSHIKI KAISHA KOBE SEIKO SHO (KOBE STEEL, LTD.), Hyogo (JP)

(*) Notice: Subject to any disclaimer, the term of this patent is extended or adjusted under 35 U.S.C. 154(b) by 39 days.

(21) Appl. No.: 17/754,004

(22) PCT Filed: Oct. 14, 2020

(86) PCT No.: PCT/JP2020/038788
§ 371 (c)(1),
(2) Date: Mar. 21, 2022

(87) PCT Pub. No.: WO2021/095425
PCT Pub. Date: May 20, 2021

(65) Prior Publication Data
US 2022/0347734 A1     Nov. 3, 2022

(30) Foreign Application Priority Data
Nov. 15, 2019   (JP) .................................. 2019-206821

(51) Int. Cl.
*B21D 39/04*     (2006.01)
*B21D 39/20*     (2006.01)
(Continued)

(52) U.S. Cl.
CPC ........... *B21D 39/04* (2013.01); *B21D 39/206* (2013.01); *B21D 53/88* (2013.01); *B29C 65/70* (2013.01)

(58) Field of Classification Search
CPC ...... B21D 39/04; B21D 39/206; B21D 53/88; B21D 3/16; B29C 65/70;
(Continued)

(56) References Cited

U.S. PATENT DOCUMENTS 1,107,284 A  *  8/1914  Gardner .................. F16K 15/12
                                                        417/504
6,276,740 B1     8/2001  Mellor et al.
(Continued)

FOREIGN PATENT DOCUMENTS

DE     10 2006 001348 A1     7/2007
DE     10 2018 101981 A1     8/2019
(Continued)

OTHER PUBLICATIONS

The extended European search report issued by the European Patent Office dated Sep. 27, 2022, which corresponds to European Patent Application No. 20886729.1-1103 and is related to U.S. Appl. No. 17/754,004.
(Continued)

*Primary Examiner* — Lawrence Averick
(74) *Attorney, Agent, or Firm* — Studebaker & Brackett PC

(57) ABSTRACT

A structure includes: a first member made of metal having a tubular shape, and having a through-insertion hole; a second member made of resin and joined to the first member; and a third member made of metal having a tubular shape, and inserted through inside the first member. The third member is tube-expanded toward the first member and joined to the first member by press-fitting.

7 Claims, 8 Drawing Sheets

(51) Int. Cl.
    *B21D 53/88*     (2006.01)
    *B29C 65/70*     (2006.01)

(58) Field of Classification Search
    CPC .... B29C 2045/14327; B29C 45/14598; B29K 2705/00; B29L 2031/3002; B62D 25/145; B62D 29/00
    See application file for complete search history.

(56) References Cited

U.S. PATENT DOCUMENTS

| | | | |
|---|---|---|---|
| 10,494,190 B2 * | 12/2019 | Hastrup | B21D 39/206 |
| 2018/0282073 A1 * | 10/2018 | Hastrup | B21D 22/105 |
| 2018/0306221 A1 * | 10/2018 | Hashimura | F16B 5/0096 |
| 2020/0180007 A1 * | 6/2020 | Maeda | B21D 39/048 |
| 2020/0246860 A1 | 8/2020 | Maeda et al. | |

FOREIGN PATENT DOCUMENTS

| | | |
|---|---|---|
| JP | 2009-262684 A | 11/2009 |
| JP | 2009-262703 A | 11/2009 |
| JP | 2017-052439 A | 3/2017 |
| JP | 2017-132053 A | 8/2017 |
| JP | 2018-161681 A | 10/2018 |
| JP | 2019-005807 A | 1/2019 |
| JP | 2019-013955 A | 1/2019 |
| JP | 2019-055431 A | 4/2019 |
| JP | 2019-151170 A | 9/2019 |

OTHER PUBLICATIONS

Notification of Transmittal of Translation of the International Preliminary Report on Patentability and Translation of Written Opinion of the International Searching Authority; PCT/JP2020/038788; dated May 27, 2022.

* cited by examiner

STRUCTURE AND METHOD FOR PRODUCING SAME

CROSS-REFERENCE TO RELATED APPLICATIONS

This is a national phase application in the United States of International Patent Application No. PCT/JP2020/038788 with an international filing date of Oct. 14, 2020, which claims priority of Japanese Patent Application No. 2019-206821 filed on Nov. 15, 2019 the contents of which are incorporated herein by reference.

TECHNICAL FIELD

The present invention relates to a structure and a method for manufacturing the same.

BACKGROUND ART

A tubular member is often used for one of some structures constituting a framework of a vehicle. For example, in a vehicle structure such as an instrument panel reinforcement, a resin bracket is joined to a tubular metal member, and the tubular member is assembled to another member via the bracket to constitute a part of a vehicle framework.

There are various methods for joining a resin member such as a bracket to a tubular metal member. For example, JP 2019-55431 A discloses a method of expanding a tubular member using an elastic body to join the tubular member to a resin member by press-fitting. Specifically, an elastic body is inserted into the tubular member, and the elastic body is pressurized in the tube axis direction to expand radially outward, thereby expanding the tubular member. At this time, by arranging the resin member around the tubular member, the tubular member is joined to the resin member by press-fitting.

Patent Document 1: JP 2019-55431 A

SUMMARY OF THE INVENTION

Problems to be Solved by the Invention

SUMMARY OF THE INVENTION

When the resin member and the tubular metal member are joined together by the method of JP 2019-55431 A, the joint portion (that is, the expanded tube portion) may be deformed due to the thermal influence, and the joining may be loosened. This is because the resin is more easily thermally deformed than the metal, since the linear expansion coefficient of the resin is larger than the linear expansion coefficient of the metal. That is, the resin member may be deformed more largely than the tubular metal member according to the temperature change, and the joining may be loosened.

The present invention has an object to suppress loosening of joining due to thermal influence even when a resin member and a tubular metal member are combined in a structure and a method for manufacturing the same.

A first aspect of the present invention provides a structure including: a first member made of metal having a tubular shape, and having a through-insertion hole; a second member made of resin and joined to the first member; and a third member made of metal having a tubular shape, and inserted through the through-insertion hole of the first member, in which the third member is tube-expanded toward the first member and joined to the first member by press-fitting.

According to the configuration, the third member made of metal is not directly joined to the second member made of resin by press-fitting, but the third member is joined to the first member by press-fitting. Since the first member and the third member are both made of metal, a difference in linear expansion coefficients of the first and third members is smaller than that between resin and metal. This makes it possible to suppress loosening of the joining according to the thermal influence. Here, as a method of joining the first member to the second member, a method using injection molding, an adhesive, or the like can be adopted.

The second member may be joined only to the first member. In addition, the first member and the second member may be joined together by the second member being injection-molded to the first member.

According to these configurations, the first member and the second member are firmly integrated by injection molding. In particular, since the second member is injection-molded only to the first member, the second member is not injection-molded to the third member. This makes it possible to variously design the shape of the third member. For example, when a resin member is directly injection-mold to a long member, a large injection molding apparatus is required, which is not preferable. However, in the above configuration, since the second member is not injection-molded to the third member, the third member may be a long member or can be designed in any other shape.

The first member may be provided with a joining hole for joining the first member to the second member, and injection molding may be performed such that the second member is cast into the joining hole of the first member.

According to this configuration, since the injection molding is performed such that the second member is cast into the joining hole, the first member and the second member can be firmly integrated while joining the first member to the third member by press-fitting is maintained.

In the structure described above, when linear expansion coefficients of materials are compared, a linear expansion coefficient of the second member may be largest, a linear expansion coefficient of the first member may be second largest, and a linear expansion coefficient of the third member may be smallest.

According to this configuration, in the structure, the linear expansion coefficient increases in order from the inside to the outside. In other words, between the second member disposed on the outermost side and the third member disposed on the innermost side, a first member having a linear expansion coefficient intermediate between those of the two is disposed. Therefore, as compared with the case where the second member and the third member are directly joined together, it is possible to form two pieces of joining (joining of the second member and the first member, and joining of the first member and the second member) having close linear expansion coefficients. Therefore, it is possible to further suppress loosening of the joining due to the thermal influence.

The cross-sectional shape perpendicular to the tube axis direction of the third member may be rectangular. In addition, a cross-sectional shape perpendicular to a tube axis direction of the first member may be a shape different from a rectangular shape.

According to this configuration, since the cross section of the third member is rectangular, the third member can be prevented from rotating around the tube axis. At this time, a cross-sectional shape other than a rectangle may also be adopted for the cross-sectional shape of the first member.

A second aspect of the present invention provides a method for manufacturing a structure, the method including: preparing a first member made of metal having a tubular shape, and having a through-insertion hole, a second member made of resin, a third member made of metal having a tubular shape, and an elastic body configured to be insertable into the third member; joining the second member to the first member; inserting the third member through the through-insertion hole of the first member; inserting the elastic body into the third member; and compressing the elastic body in a tube axis direction of the third member to expand the elastic body radially outward so that the third member is tube-expanded radially outward to join the third member to the first member by press-fitting.

According to this method, it is possible to suppress loosening of joining due to a thermal influence as described above. In particular, in the above method, since the elastic body is used in the joining by press-fitting by tube expansion, the material and shape of the third member to be tube-expanded can be set substantially optionally. For example, electromagnetic forming can be considered as one of the methods of joining by press-fitting by similar tube expansion, but electromagnetic forming can be applied only to a member made of a highly conductive material and having a circular cross section. However, as with the above method, in the joining by press-fitting by tube expansion using the elastic body, there is no such constraint. In addition, in the joining by press-fitting by tube expansion using an elastic body, a general press machine can be used without requiring a large special facility such as electromagnetic forming.

When the second member is joined to the first member, the second member may be injection-molded only to the first member.

According to this method, the first member and the third member are firmly integrated by injection molding. In particular, since the second member is injection-molded only to the first member, the second member is not injection-molded to the third member. This makes it possible to variously design the shape of the third member. Specifically, for example, when a resin member is directly injection-molded to a long member, a large injection molding apparatus is required, which is not preferable. However, in the above configuration, since the second member is not injection-molded to the third member, the third member may be a long member or can be designed in any other shape.

In the method for manufacturing a structure, when linear expansion coefficients of materials are compared, a linear expansion coefficient of the second member may be largest, a linear expansion coefficient of the first member may be second largest, and a linear expansion coefficient of the third member may be smallest.

According to this method, in the structure to be manufactured, the linear expansion coefficient increases in order from the inside to the outside. In other words, between the second member to be disposed on the outermost side and the third member to be disposed on the innermost side, a first member having a linear expansion coefficient intermediate between those of the two is to be disposed. Therefore, it is possible to form two pieces of joining (joining of the second member and the first member, and joining of the first member and the second member) having closer linear expansion coefficients than the case where the second member and the third member are directly joined. Therefore, it is possible to further suppress loosening of the joining due to the thermal influence.

The cross-sectional shape perpendicular to the tube axis direction of the third member may be rectangular. In addition, a cross-sectional shape perpendicular to a tube axis direction of the first member may be a shape different from a rectangular shape.

According to this configuration, since the cross section of the third member is rectangular, the third member can be prevented from rotating around the tube axis. In addition, in the joining by press-fitting by tube expansion using the elastic body, unlike electromagnetic forming, since the cross-sectional shape of the member to be tube-expanded does not matter, even when the cross-sectional shape of the third member is rectangular, joining can be easily achieved. At this time, a cross-sectional shape other than a rectangle may also be adopted for the cross-sectional shape of the first member.

According to the present invention, loosening of joining due to thermal influence can be suppressed even when a resin member and a tubular metal member are combined in a structure and a method for manufacturing the same.

MODE FOR CARRYING OUT THE INVENTION

In the following, embodiments of the present invention will be described with reference to the accompanying drawings.

Figure 1:
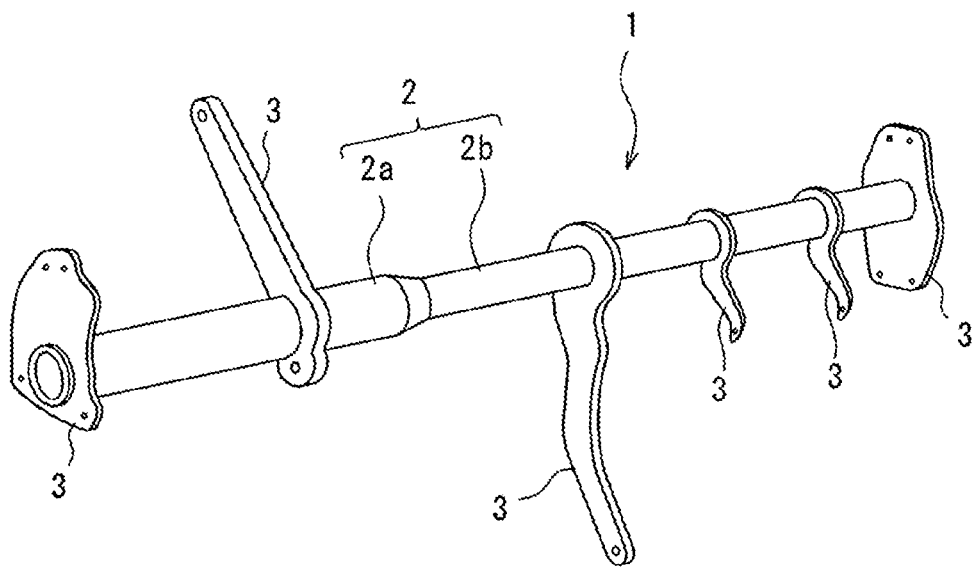
FIG. 1 is a perspective view of a general instrument panel reinforcement.

FIG. 1 is a perspective view of a general instrument panel reinforcement 1. The instrument panel reinforcement 1 is one of vehicle structural members disposed in the front portion of the vehicle interior and extending in the vehicle width direction. The instrument panel reinforcement 1 is formed by joining various brackets 3 to the tubular member 2. The tubular member 2 has a circular tubular shape with a partially different diameter. In general, the portion 2a having a larger diameter is disposed on the driver seat side, and the portion 2b having a smaller diameter is disposed on the passenger seat side. For example, the tubular member 2 is made of metal. The brackets 3 are made of resin.

Figure 2:
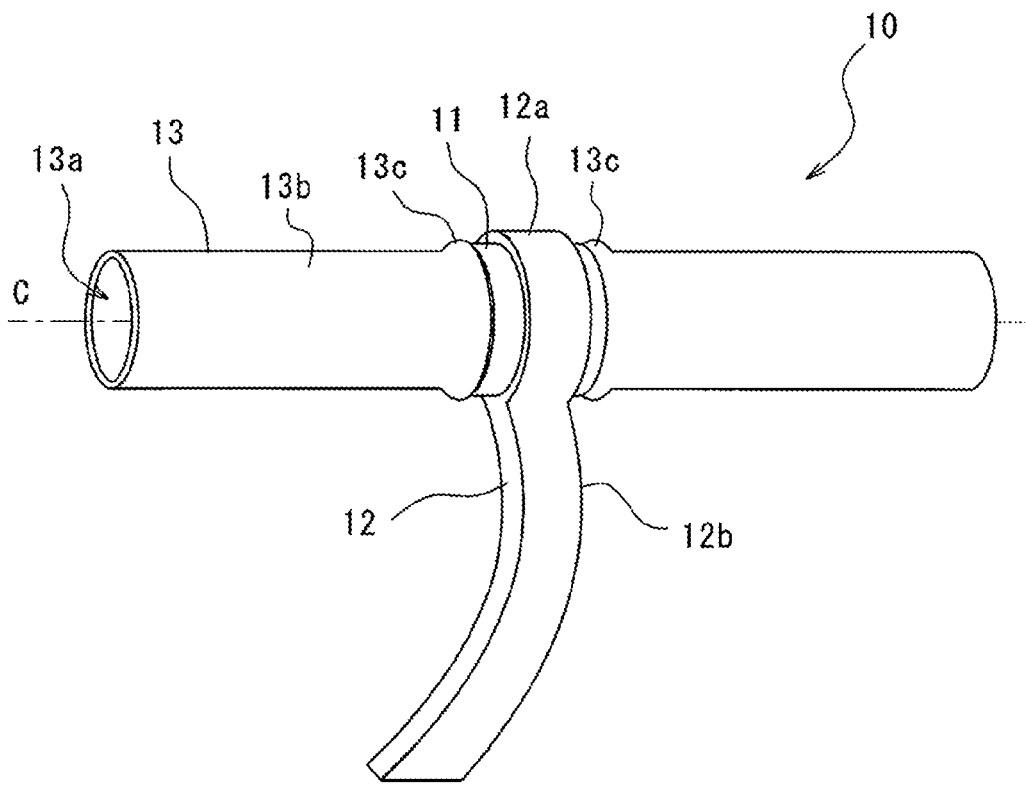
FIG. 2 is a perspective view of a structure according to an embodiment of the present invention.

FIG. 2 is a perspective view of a structure 10 to which the joining of the present embodiment is applied at the joint portion of the tubular member 2 and the bracket 3 in the instrument panel reinforcement 1 as shown in FIG. 1. This structure 10 can be adopted not only for the instrument panel reinforcement 1 but also for a frame of a bicycle, a hydraulic pipe of a construction machine such as a crane, a frame of another transportation machine, or the like.

The structure 10 includes a tubular first member 11 made of metal, a second member 12 made of resin and joined to an outer peripheral surface of the first member 11, and a tubular third member 13 made of metal and inserted into the first member 11. In the structure 10, the third member 13 is expanded toward and joined to the first member 11 by press-fitting as will be described below.

Figure 3:
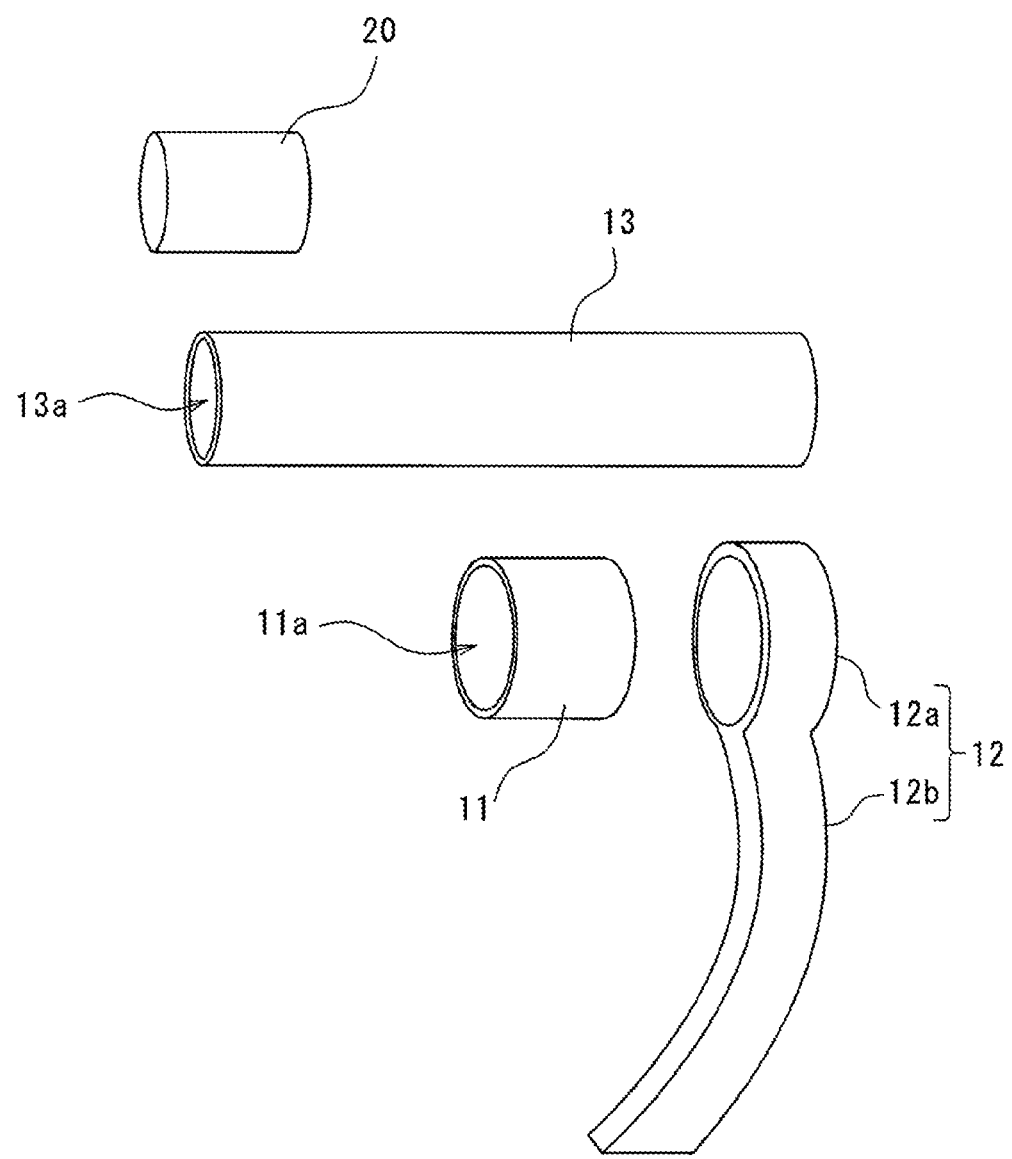
FIG. 3 is a perspective view showing a first step of a method for manufacturing the structure in FIG. 2.

The first member 11 is a circular tubular member with both ends opened, and has a through-insertion hole lie (see FIG. 3). The through-insertion hole 11a has a diameter through which the third member 13 can be inserted. For example, the first member 11 is made of an aluminum alloy. The first member 11 is an additional member not adopted in the instrument panel reinforcement 1 shown in FIG. 1.

The third member 13 is a circular tubular member opened a both ends, and has an into-insertion hole 13a. The third member 13 is longer than the first member 11 and is inserted through the through-insertion hole 11a of the first member 11. The third member 13 includes a circular tubular main body 13b and bulging portions 13c and 13c extending in the circumferential direction of the main body 13b and bulging radially outward. The bulging portions 13c and 13c are disposed on both sides of the first member 11 in the direction of the tube axis (central axis) C of the main body 13b. For example, the third member 13 is made of steel. The third member 13 constitutes the tubular member 2 in the instrument panel reinforcement 1 shown in FIG. 1.

The second member 12 includes an annular holding portion 12a and an extending portion 12b extending from the holding portion 12a. The first member 11 is inserted through the holding portion 12a. The extending portion 12b is attached to another member (not shown). The second member 12 is made of resin. The second member 12 constitutes the bracket 3 in the instrument panel reinforcement 1 shown in FIG. 1. It should be noted that the shape of the second member 12 is not particularly limited, and for example, the holding portion 12a does not need to be annular by cutting out a part of the holding portion 12a.

The second member 12 is joined to the outer peripheral surface of the first member 11 on the inner surface of the holding portion 12a. In the present embodiment, the second member 12 is joined only to the first member 11 by injection molding. The mode of joining is not limited to injection molding, and for example, an adhesive may be used.

Preferably, when the linear expansion coefficients of the respective materials are compared, that of the second member 12 is the largest, that of the first member 11 is the second largest, and that of the third member 13 is the smallest. In the present embodiment, as described above, the material of the second member 12 is resin, the material of the first member 11 is an aluminum alloy, and the material of the third member 13 is steel. In general, when these linear expansion coefficients are compared, that of resin is the largest, that of an aluminum alloy is the second largest, and that of steel is the smallest. Therefore, the above suitable arrangement is obtained.

As another example constituting the above suitable arrangement, the second member 12 may be made of resin, the first member 11 may be made of a magnesium alloy, and the third member 13 may be made of steel. In general, when these linear expansion coefficients are compared, that of resin is the largest, that of a magnesium alloy is the second largest, and that of steel is the smallest. Therefore, the above suitable arrangement is obtained.

Hereinafter, a method for manufacturing the structure 10 according to the present embodiment will be described.

First, referring to FIG. 3, a first member 11, a second member 12, a third member 13, and a rubber member (elastic body) 20 insertable into the third member 13 are prepared. It should be noted that in FIG. 3, the shape of the second member 12 is clearly shown as a single body for the sake of clarity of description, but in the present embodiment, the second member 12 is injection-molded to the first member 11 and thus does not independently form its shape. That is, as shown in FIG. 4 described below, the second member 12 is joined to the first member 11 and is formed in its shape at the same time.

In the present embodiment, the rubber member 20 has a columnar shape and has dimensions that can be inserted into the third member 13. It is preferable that the outer shape of the rubber member 20 has similarity to the inner shape of the third member 13 (into-insertion hole 13a) in the cross section perpendicular to the tube axis direction of the third member 13, and is as large as possible as long as insertable. The material of the rubber member 20 is preferably any one of urethane rubber, chloroprene rubber, CNR rubber (chloroprene rubber+nitrile rubber), and silicone rubber, for example. In addition, the hardness of the rubber member 20 is preferably 30 or more in Shore A.

Figure 4:
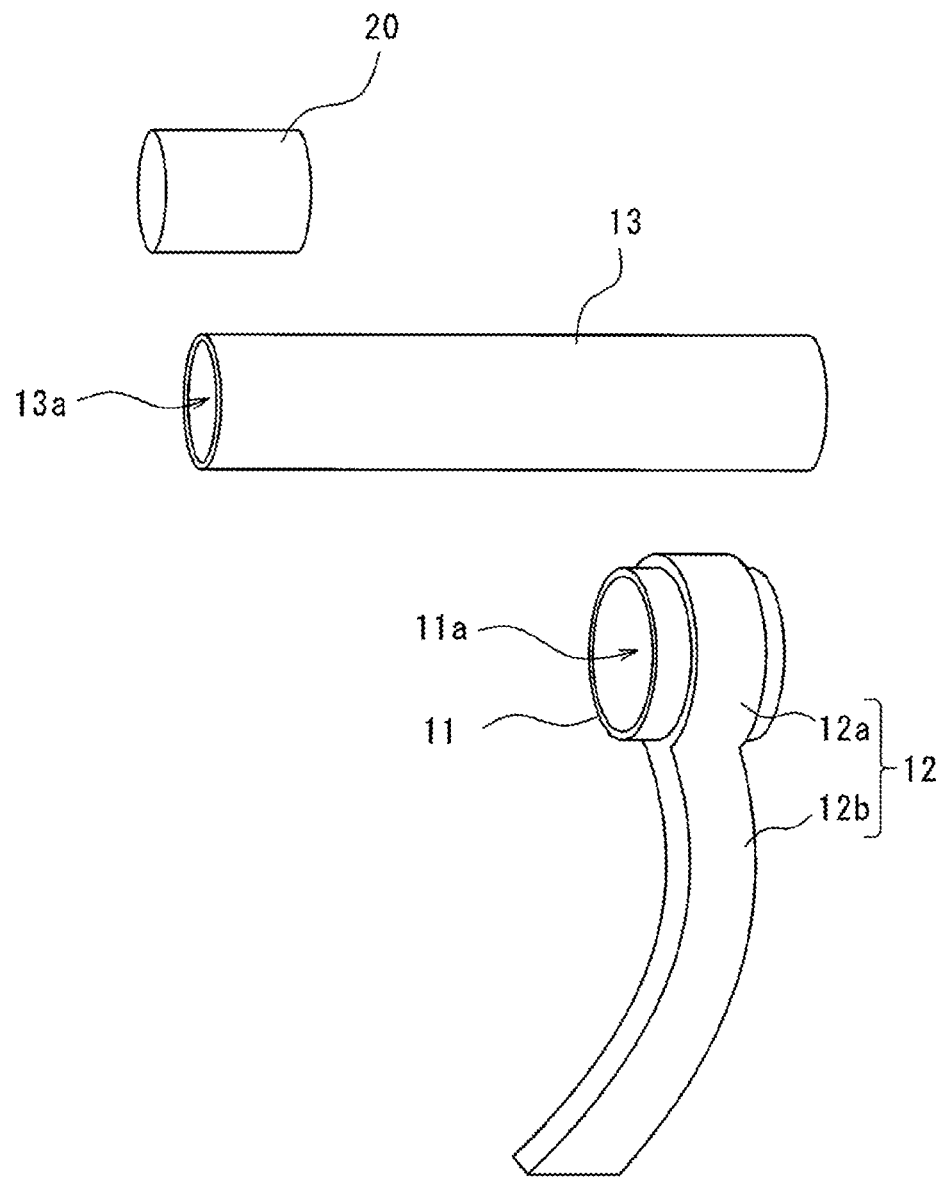
FIG. 4 is a perspective view showing a second step of the method for manufacturing the structure in FIG. 2.

Next, referring to FIG. 4, the second member 12 is injection-molded to the outer peripheral surface of the first member 11. Thus, the first member 11 and the second member 12 are integrated. It should be noted that the second member 12 is injection-molded only to the first member 11, and is not injection-molded to the third member 13.

Figure 5:
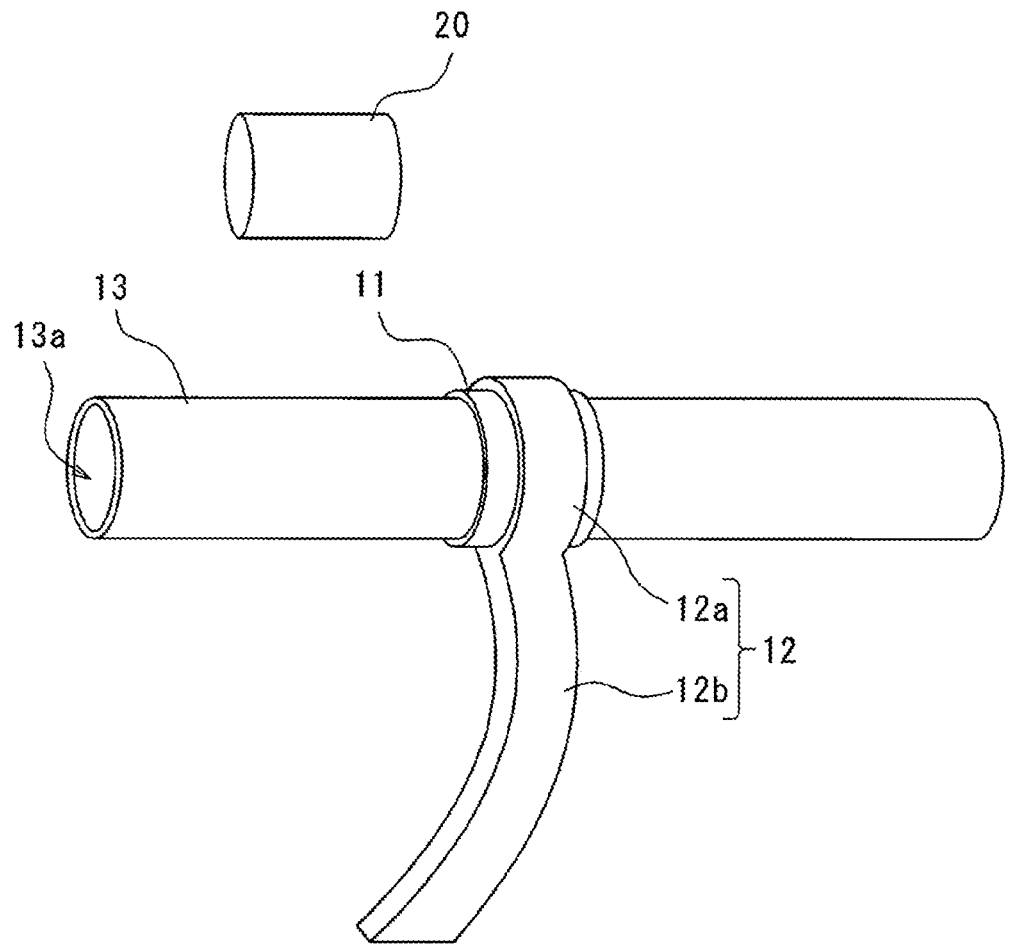
FIG. 5 is a perspective view showing a third step of the method for manufacturing the structure in FIG. 2.

Next, referring to FIG. 5, the third member 13 is inserted through the through-insertion hole 11a of the first member 11. Thereafter, the rubber member 20 is inserted into the into-insertion hole 13a of the third member 13. Alternatively, before the third member 13 is inserted through the through-insertion hole lie of the first member 11, the rubber member 20 may be inserted into the into-insertion hole 13a of the third member 13 in advance. Thus, the rubber member 20, the third member 13, the first member 11, and the second member 12 are disposed in this order from the inner side to the outer side in the radial direction.

Next, referring to FIG. 2 again, the rubber member 20 is compressed in the tube axis C direction of the third member 13 and expanded radially outward, whereby the third member 13 is tube-expanded radially outward and joined to the first member 11 by press-fitting. That is, the bulging portions 13c and 13c of the third member 13 are formed. In this manner, the structure 10 in which the first member 11, the second member 12, and the third member 13 are joined is formed.

Figure 6:
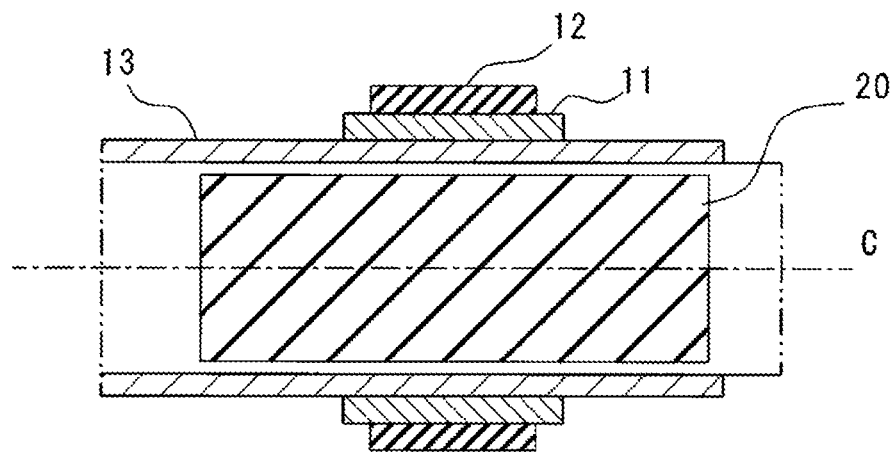
FIG. 6 is a first cross-sectional view showing a fourth step of the method for manufacturing the structure in FIG. 2.
Figure 7:
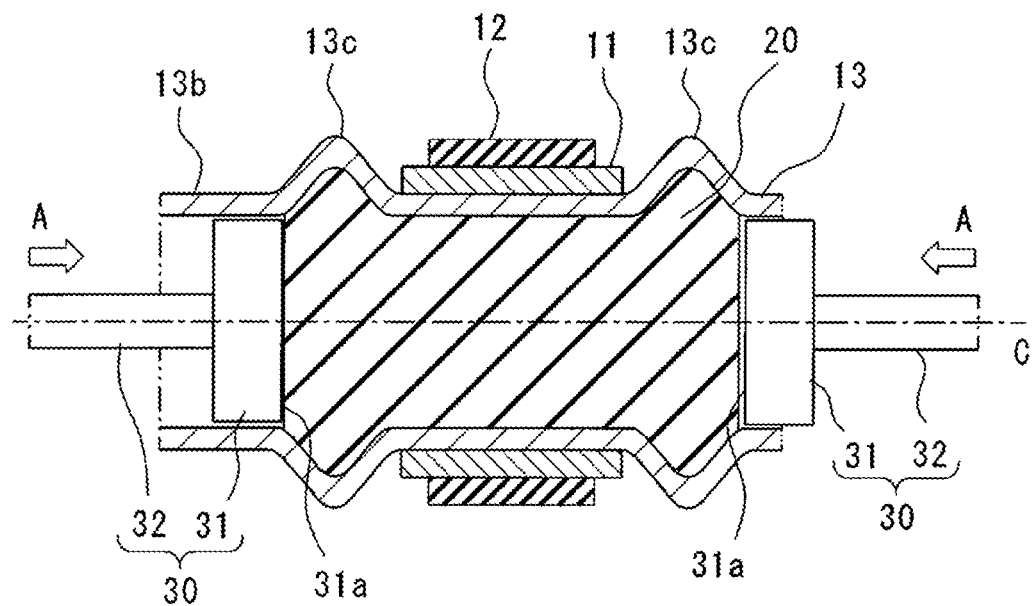
FIG. 7 is a second cross-sectional view showing a fourth step of the method for manufacturing the structure in FIG. 2.
Figure 8:
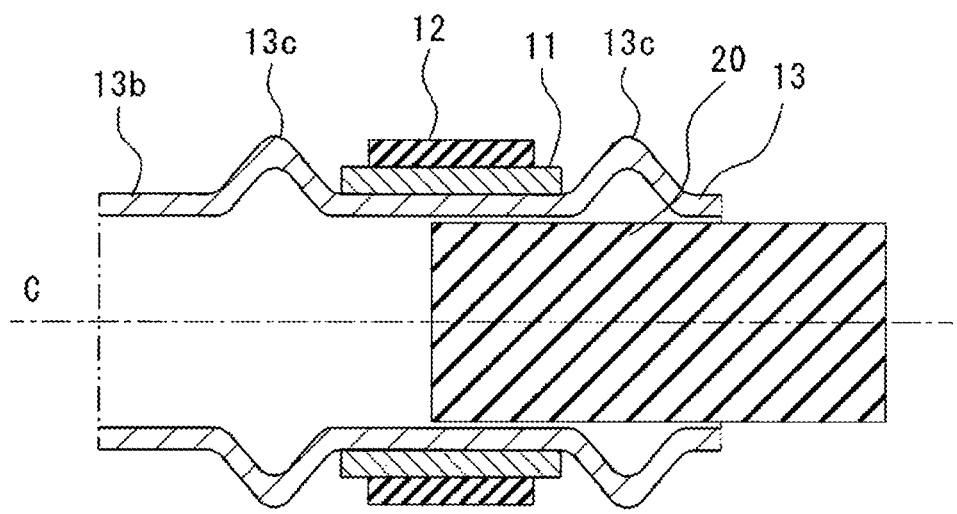
FIG. 8 is a third cross-sectional view showing a fourth step of the method for manufacturing the structure in FIG. 2.

With reference to FIGS. 6 to 8, joining by press-fitting by tube expansion using the above-described rubber member 20 will be described in detail.

First, referring to FIG. 6, before joining by press-fitting, the rubber member 20, the third member 13, the first member 11, and the second member 12 are disposed in order from the inside to the outside. At this time, the positions of the rubber member 20, the first member 11, and the second member 12 are aligned in the tube axis C direction.

Next, with reference to FIG. 7, the respective pushers 30 are inserted from both end openings in the tube axis C direction of the third member 13, and the pushers 30 are arranged on both sides of the rubber member 20 in the tube axis C direction. The pusher 30 includes a pressing portion 31 for pressing the rubber member 20 and a rod-shaped support portion 32 for supporting the pressing portion 31. The pressing portion 31 has a columnar shape and includes a flat pressing surface 31a as an end surface. The pressing portion is attached to a press machine (not shown) or the like with interposition of the support portion 32, and is driven by the press machine to sandwich the rubber member 20 with the pressing surfaces 31a to compress the rubber member 20 in the tube axis C direction of the third member 13 (see an arrow A in FIG. 7). With this compression, the rubber member 20 expands radially outward of the third member 13. The third member 13 is tube-expanded by radially outward expansion of the rubber member 20. Thus, the first member 11 and the third member 13 are joined together by press-fitting. At this time, the bulging portions 13c and 13c are formed on both sides in the tube axis C direction of the third member 13 with respect to the first member 11.

Next, referring to FIG. 8, after joining the first member 11 to the third member 13 by press-fitting, a press machine (not shown) is driven to release the compression of the rubber member 20 by the pusher 30. The rubber member 20 from which the compressive force by the pusher 30 is removed is restored to the original shape by the elasticity of the rubber member 20 itself. Therefore, the rubber member 20 can be easily removed from the third member 13.

According to the present embodiment, the third member 13 made of metal is not directly joined to the second member 12 made of resin by press-fitting, but the third member 13 is joined to the first member 11 by press-fitting. Since the first member 11 and the third member 13 are both made of metal, a difference in linear expansion coefficients of the first and third members is smaller than that between resin and metal. This makes it possible to suppress loosening of the joining according to the thermal influence. In particular, in the above method, since the rubber member 20 is used in the joining by press-fitting by tube expansion, the material and shape of the third member 13 to be tube-expanded can be set substantially optionally. For example, electromagnetic forming can be considered as one of the methods of joining by press-fitting by similar tube expansion, but electromagnetic forming can be applied only to a member made of a highly conductive material and having a circular cross section. However, as in the above method, in the joining by press-fitting by tube expansion using the rubber member 20, there is no such constraint. In addition, in the joining by press-fitting by tube expansion using the rubber member 20, a general press machine can be used without requiring a large special facility such as electromagnetic forming.

In addition, the first member 11 and the second member 12 are firmly integrated by injection molding. In particular, since the second member 12 is injection-molded only to the first member 11, the second member 12 is not injection-molded to the third member 13. This makes it possible to variously design the shape of the third member 13. For example, when a resin member is directly injection-molded to a long member, a large injection molding apparatus is required, which is not preferable. However, in the above configuration, since the second member 12 is not injection-molded to the third member 13, the third member 13 may be a long member or can be designed in any other shape.

In addition, in the structure 10, the linear expansion coefficient increases in order from the inside to the outside. In other words, between the second member 12 disposed on the outermost side and the third member 13 disposed on the innermost side, a first member 11 having a linear expansion coefficient intermediate between those of the two is disposed. Therefore, as compared with the case where the second member 12 and the third member 13 are directly joined together, it is possible to form two pieces of joining (joining of the second member and the first member, and joining of the first member 11 and the second member 12) having close linear expansion coefficients. Therefore, it is possible to further suppress loosening of the joining due to the thermal influence.

(Modification)

In the above embodiment, the first member 11 and the third member 13 both having a circular tubular shape are exemplified, but the shapes of the first member 11 and the third member 13 are not particularly limited. For example, the cross-sectional shape perpendicular to the tube axis C direction of the third member 13 may be rectangular. At this time, the cross-sectional shape perpendicular to the tube axis C direction of the first member 11 may be different from the rectangular shape (see FIG. 9).

Figure 9:
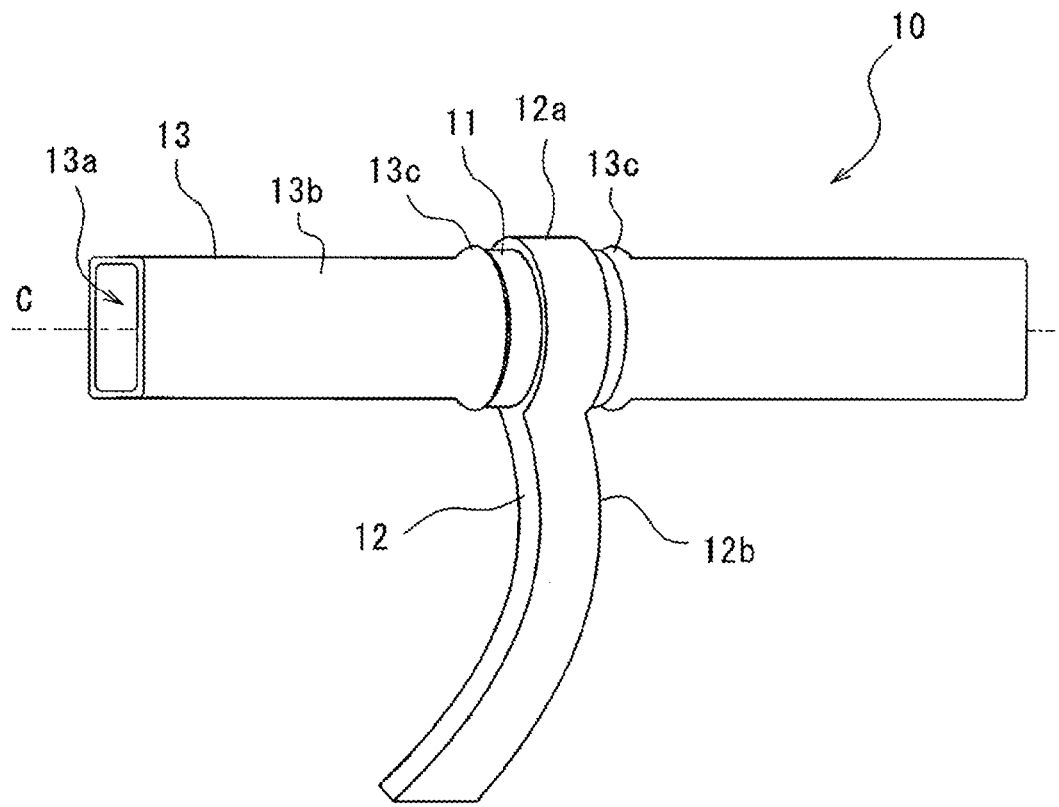
FIG. 9 is a perspective view showing a modification of the structure in FIG. 2.

As shown in FIG. 9 even when the third member 13 having a rectangular cross section and the first member 11 having a circular cross section different from a rectangular cross section are joined, the first member 11 and the third member 13 can be easily joined together by performing joining by press-fitting by tube expansion using the rubber member 20.

Figure 10:
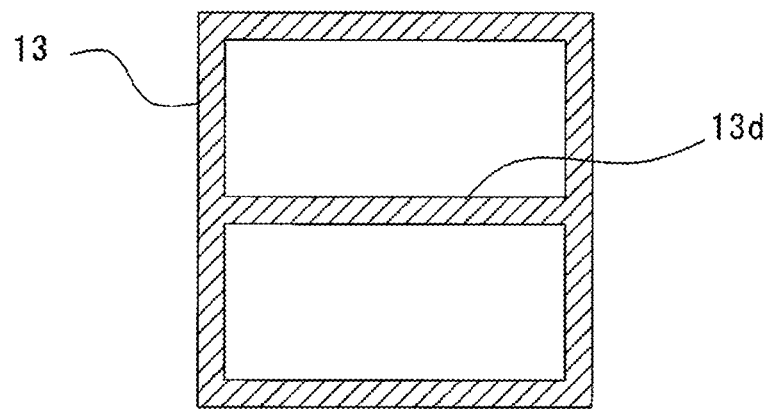
FIG. 10 is a cross-sectional view showing a first modification of a third member.
Figure 11:
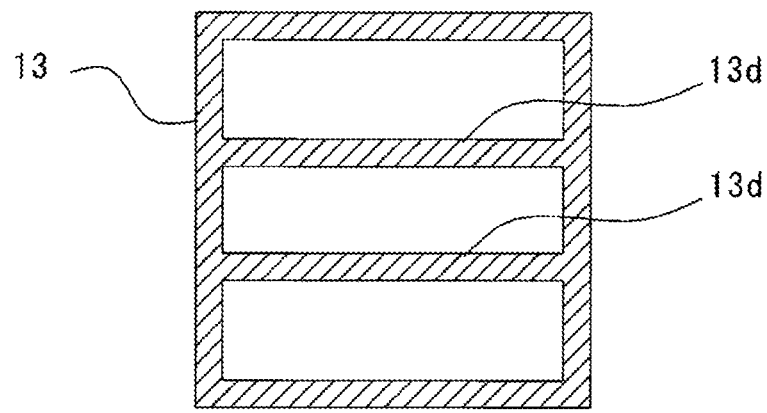
FIG. 11 is a cross-sectional view showing a second modification of the third member.
Figure 12:
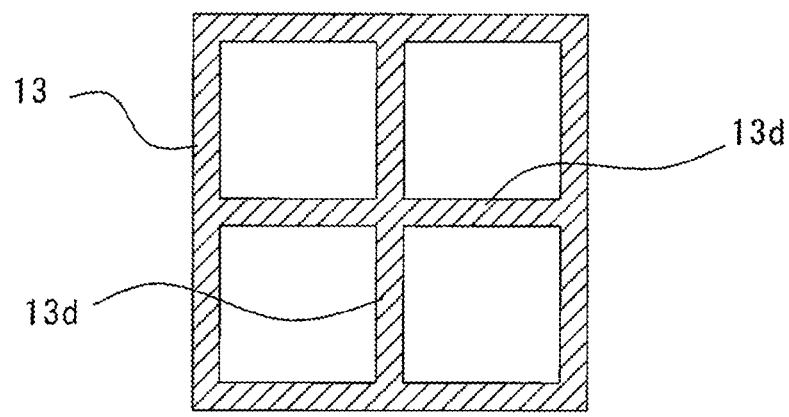
FIG. 12 is a cross-sectional view showing a third modification of the third member.

Alternatively, the cross-sectional shape perpendicular to the tube axis C direction of the third member 13 may be a polygon other than a rectangle, or an ellipse. In addition, with reference to FIGS. 10 to 12 showing a cross section perpendicular to the tube axis C direction, a partition wall 13d may be provided to partition the inside of the third member 13. The partition wall 13d extends in the tube axis direction inside the third member 13. For example, only one partition wall 13d may be provided (see FIG. 10), two partition walls may be provided in parallel (see FIG. 11), or two partition walls may be provided in a cross shape (see FIG. 12).

When the partition wall 13d is provided as shown in FIGS. 10 to 12, the rubber member 20 may be disposed in each of a plurality of chambers in the third member 13 partitioned by the partition wall 13d. Thus, even when the partition wall 13d is provided, the third member 13 can be reliably tube-expanded.

In addition, the cross-sectional shape perpendicular to the tube axis direction of the first member 11 may be a circle, an ellipse, a rectangle, a polygon other than a rectangle, or the like. At this time, the cross-sectional shapes of the first member 11 and the third member 13 may be different.

According to the present modification, since the cross section of the third member 13 is rectangular, the third member 13 can be prevented from rotating around the tube axis. In addition, in the joining by press-fitting by tube expansion using the rubber member 20, unlike electromagnetic forming, since the cross-sectional shape of the member to be tube-expanded does not matter, even when the cross-sectional shape of the third member 13 is rectangular, joining can be easily achieved. At this time, a cross-sectional shape other than a rectangle may also be adopted for the cross-sectional shape of the first member 11.

(Another Modification)

Figure 13:
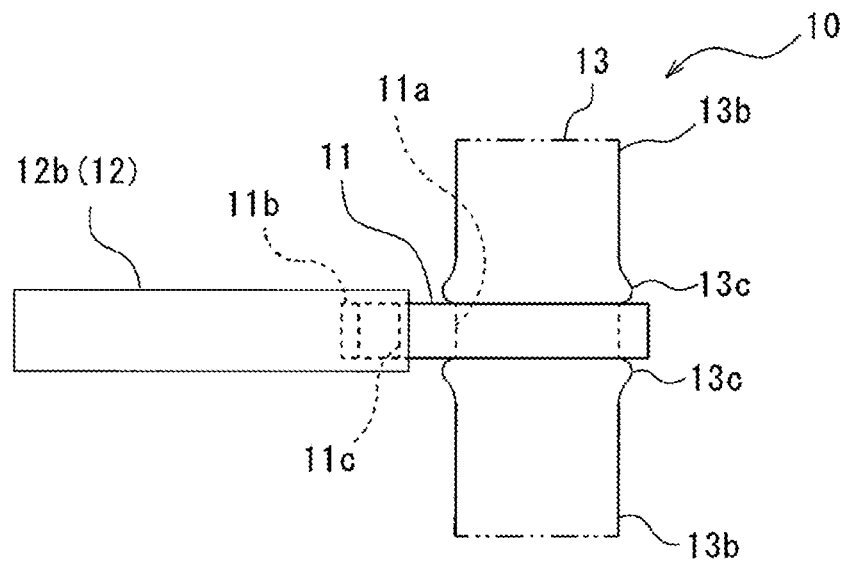
FIG. 13 is a front view showing another modification of the structure in FIG. 2.
Figure 14:
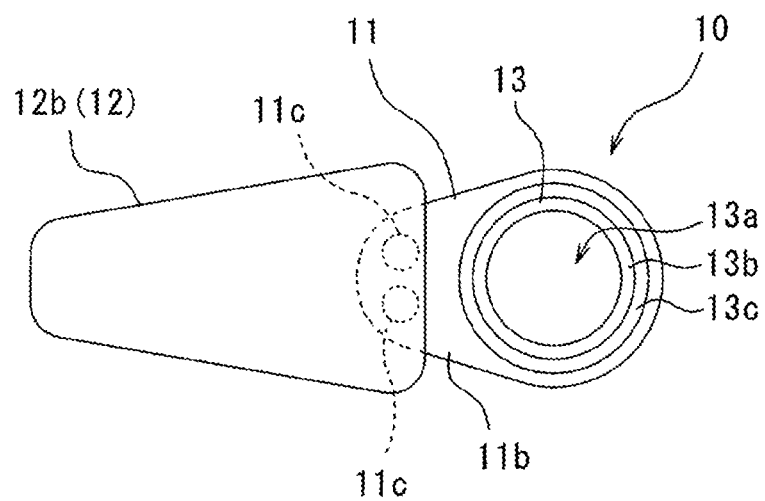
FIG. 14 is a plan view of the structure in FIG. 13.

In the above embodiment, the second member 12 is joined to the outer peripheral surface of the first member 11 on the inner surface of the annular holding portion 12a, but this joining mode can be various. For example, as shown in FIGS. 13 and 14, the first member 11 may be provided with a flange portion 11b having a partially enlarged diameter, and the flange portion 11b may be provided with a joining hole 11c for joining to the second member 12. Then, both the members 11 and 12 may be joined by injection molding such that the second member 12 is cast into the joining hole 11c.

In the first member 11 of the present modification, the joining hole 11c is a hole penetrating the first member 11 in the same direction as the through-insertion hole 11a. The joining hole 11c of the present modification includes two circular holes, but the shape thereof is not particularly limited.

The second member 12 of the present modification does not include an annular holding portion 12a (see FIG. 2), and is injection-molded so that a part of the extending portion 12b covers the joining hole 11c of the first member 11.

According to the present modification, it is possible to provide a structure 10 in which the first member 11 and the second member 12 are firmly integrated while maintaining joining the first member 11 to the third member 13 by press-fitting described above.

As described above, although the specific embodiments and the modifications of the present invention are described, the present invention is not limited to the above-described embodiments, and can be implemented with various modifications within the scope of the present invention.

The invention claimed is:

1. A method for manufacturing a structure, the method comprising:
    preparing a first member made of metal having a tubular shape, and having a through-insertion hole, a second member made of resin, a third member made of metal having a tubular shape, and an elastic body separate from the second member and configured to be insertable into the third member;
    joining the second member to an outer peripheral surface of the first member;
    inserting the third member through the through-insertion hole of the first member;
    inserting the elastic body into the third member; and
    compressing the elastic body in a tube axis direction of the third member to expand the elastic body radially outward so that the third member is tube-expanded radially outward to join the third member to the first member by press-fitting.

2. The method for manufacturing a structure according to claim 1, wherein when the second member is joined to the first member, the second member is injection-molded only to the first member and is not injection-molded to the third member.

3. The method for manufacturing a structure according to claim 1, wherein when linear expansion coefficients of materials are compared, a linear expansion coefficient of the second member is largest, a linear expansion coefficient of the first member is second largest, and a linear expansion coefficient of the third member is smallest.

4. The method for manufacturing a structure according to claim 1, wherein a cross-sectional shape perpendicular to a tube axis direction of the third member is rectangular.

5. The method for manufacturing a structure according to claim 4, wherein a cross-sectional shape perpendicular to a tube axis direction of the first member is a shape different from a rectangular shape.

6. The method for manufacturing a structure according to claim 2, wherein when linear expansion coefficients of materials are compared, a linear expansion coefficient of the second member is largest, a linear expansion coefficient of the first member is second largest, and a linear expansion coefficient of the third member is smallest.

7. The method for manufacturing a structure according to claim 2, wherein a cross-sectional shape perpendicular to a tube axis direction of the third member is rectangular.

* * * * *